US011464154B2

(12) United States Patent
Thompson et al.

(10) Patent No.: US 11,464,154 B2
(45) Date of Patent: Oct. 11, 2022

(54) MULTI-PRODUCT SENSING SYSTEM FOR A COMMON CONDUIT OF AN AGRICULTURAL PRODUCT DISTRIBUTION SYSTEM

(71) Applicant: CNH INDUSTRIAL CANADA, LTD., Saskatoon (CA)

(72) Inventors: Dennis George Thompson, Eagle Ridge (CA); Trevor Lawrence Kowalchuk, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 925 days.

(21) Appl. No.: 16/263,487

(22) Filed: Jan. 31, 2019

(65) Prior Publication Data
US 2020/0245529 A1  Aug. 6, 2020

(51) Int. Cl.
| | |
|---|---|
| *A01C 7/08* | (2006.01) |
| *G01F 1/76* | (2006.01) |
| *G05D 11/13* | (2006.01) |
| *G05D 7/06* | (2006.01) |
| *A01B 76/00* | (2006.01) |

(52) U.S. Cl.
CPC .............. *A01C 7/082* (2013.01); *G01F 1/76* (2013.01); *G05D 11/139* (2013.01); *A01B 76/00* (2013.01); *G05D 7/0605* (2013.01)

(58) Field of Classification Search
CPC .......... A01C 7/082; A01C 7/081; A01C 7/08; A01C 7/00; G01F 1/76; G01F 1/00; G05D 7/0605; G05D 7/06; G05D 7/00; G05D 11/139; G05D 11/13; G05D 11/02; G05D 11/00; A01B 76/00
See application file for complete search history.

(56) References Cited

U.S. PATENT DOCUMENTS

| | | |
|---|---|---|
| 3,881,353 A | 5/1975 | Fathauer |
| 5,343,761 A | 9/1994 | Myers |
| 6,296,425 B1 | 10/2001 | Memory et al. |
| 6,526,120 B1 | 2/2003 | Gray et al. |
| 6,527,205 B2 | 3/2003 | Andersson et al. |

(Continued)

FOREIGN PATENT DOCUMENTS

WO  WO-2015120470 A1 * 8/2015 ........... A01B 79/005

*Primary Examiner* — Christopher J. Novosad
(74) *Attorney, Agent, or Firm* — Rebecca L. Henkel; Rickard K. DeMille (57) ABSTRACT

An air cart for use in an agricultural air seeding system includes a first storage compartment for holding a first granular product type. The air cart also includes a second storage compartment for holding a second granular product type different from the first granular product type. The air cart further includes a common conduit configured to receive the first granular product type from the first storage compartment and the second granular product type from the second storage compartment to enable simultaneous flow of the first granular product type and the second granular product type. The air cart even further includes a multi-product particle flow rate sensing system configured to monitor respective flow rates for both the first granular product type and the second granular product type during simultaneous flow of the first granular product type and the second granular product type through the common conduit.

20 Claims, 5 Drawing Sheets

(56) References Cited

U.S. PATENT DOCUMENTS

| | | |
|---|---|---|
| 8,004,683 B2 | 8/2011 | Tokhtuev et al. |
| 8,346,491 B2 | 1/2013 | Loose et al. |
| 8,504,310 B2 | 8/2013 | Landphair et al. |
| 8,950,260 B2 | 2/2015 | Gelinske et al. |
| 9,043,949 B2 | 6/2015 | Liu |
| 9,497,899 B2 | 11/2016 | Glowa et al. |
| 2010/0264163 A1 | 10/2010 | Tevs et al. |
| 2012/0036914 A1 | 2/2012 | Landphair et al. |
| 2013/0125612 A1 | 5/2013 | Hays et al. |
| 2014/0076218 A1 | 3/2014 | Liu |

* cited by examiner

MULTI-PRODUCT SENSING SYSTEM FOR A COMMON CONDUIT OF AN AGRICULTURAL PRODUCT DISTRIBUTION SYSTEM

BACKGROUND

The disclosure relates generally to an agricultural product distribution system and, more specifically, a multi-product sensing system for a common conduit of the agricultural product distribution system.

Generally, a seeding implement (e.g., a seeder) may be towed behind an off-road vehicle, such as a tractor, via a mounting bracket secured to a rigid frame of the seeding implement. The seeding implement may include multiple row units distributed across a width of the implement. More specifically, each row unit may deposit seeds at a desired depth beneath the soil surface of a field as the seeding implement is towed. For example, each row unit may include a ground engaging tool or opener that forms a seeding path (e.g., trench) into the soil. A seed tube may then deposit a granular product, such as seeds and/or fertilizer, into the trench. As the row unit travels through the field, closing discs may move excavated soil back into the trench covering the granular product. In this manner, rows of seeds may be planted.

In certain configurations, the granular product may be delivered to the row units of the seeding implement from a centralized location, such as an air cart. In certain embodiments, the air cart may be connected in series with the seeding implement (e.g., in front of or behind the seeding tool to form a multi-implement train). The air cart may generally include a storage tank (e.g., a pressurized tank) having separate compartments for different product types (e.g., seed, fertilizer, etc.), an air source (e.g., a blower), and a metering assembly. More specifically, the granular products (seeds, fertilizer, etc.) may be gravity fed from the storage tank into the metering assembly, which distributes a desired flow rate of the granular products to each of the row units. For example, the air source may generate an air stream and the metering assembly may control flow of granular products into the air stream such that the granular products are entrained in the air stream. The air stream may then be supplied to each of the row units via primary lines fluidly coupled between the metering assembly and the row units, thereby delivering the granular products to each of the row units for deposition. These different granular products can either be distributed through the same distribution lines or separate lines (e.g., for seed and fertilizer). Conveying different products in separate lines and deposited in separate soil trenches by the openers is commonly known as a "double-shoot" seeding system. Conversely, products can also be combined in the same distribution line for deposition in the same soil trench. Seeding systems that strictly deliver products in a common distribution line (e.g., seed and fertilizer) are commonly known as "single shoot" systems. With double shoot systems, it is also common practice to combine products in the same line when blending products in the same soil trench is desired ("starter" fertilizer with seed for instance). While the air cart product meter system typically controls the product dispensing rate, it is becoming possible with new technology development for sensors mounted in the product distribution lines to regulate the product metering systems by counting these products flowing through these common distribution lines. By counting the product particles flowing through the conduit a real-time mass flow rate or seeding rate can be established. This flow rate feedback is then used by the product metering system to regulate the flow rate to a target rate set by the operator. By using particle counting sensors, the need to pre-calibrate the air cart metering system can be eliminated which saves the operator time and improves overall productivity. However, these sensors are not able to differentiate and count the different product types flowing through the common distribution line simultaneously. Thus, making real-time mass flow rate sensing difficult to achieve in multi-product metering systems.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, an air cart for use in an agricultural air seeding system is provided. The air cart includes a first storage compartment for holding a first granular product type. The air cart also includes a second storage compartment for holding a second granular product type different from the first granular product type. The air cart further includes a common conduit configured to receive the first granular product type from the first storage compartment and the second granular product type from the second storage compartment to enable simultaneous flow of the first granular product type and the second granular product type. The air cart even further includes a multi-product particle flow rate sensing system configured to monitor respective flow rates for both the first granular product type and the second granular product type during simultaneous flow of the first granular product type and the second granular product type through the common conduit.

In another embodiment, a multi-product particle flow rate sensing system for an air cart is provided. The system includes a first sensor or sensor array configured to couple to a common conduit at a first location where a first granular product type and a second granular product type different from the first granular product type flow simultaneously through the common conduit. The system also includes a controller coupled to the first sensor or sensor array and configured to receive feedback from the first sensor or sensor array and to determine a first flow rate for the first granular product type, a second flow rate for the second granular product type, or both the first flow rate and the second flow rate based on the feedback.

In a further embodiment, a method for multi-product particle flow rate sensing for an air cart is provided. The method includes receiving, at a controller, feedback from a first sensor or sensor array coupled to a common conduit at a first location where a first granular product type and a second granular product type different from the first granular product type flow simultaneously through the common conduit. The method further includes determining, via the controller, a first flow rate for the first granular product type, a second flow rate for the second granular product type, or both the first flow rate and the second flow rate based on the feedback from the first sensor or sensor array.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE DRAWINGS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Generally an agricultural product distribution system may include a towable agricultural implement to deposit a granular product into the soil. As used herein, the granular product may be any suitable particulate material that is desired to be deposited into the ground, such as various types of seeds and fertilizers. Nevertheless, one or ordinary skill in the art would recognize that the techniques described herein may be easily adapted for use with other products.

More specifically, the agricultural implement may include row units that open the soil, dispense the granular product into the soil opening, and re-close the soil as the agricultural implement is towed across a field, for example, by an off-road work vehicle, such as a tractor. Additionally, the agricultural product distribution system may include an air cart that distributes the granular product to the row units on the agricultural implement. More specifically, in some embodiments, a metering system on the air cart may pneumatically distribute the granular product to the row units. For example, the metering assembly may control output of the granular product from a storage tank into an air stream, which is then delivered to the row units by a blower via pneumatic lines (e.g., including a primary line coupled to the air cart) that fluidly connect the metering assembly to the row units.

In current dryland farming practices, multiple different products (e.g., seed, fertilizer, etc.) are typically metered though the same distribution line. Sensors may be utilized to regulate product metering systems by counting the particles and adjusting the metering devices in real-time to maintain a pre-set application rate or plant population (i.e., number of seeds/acre). Currently, seed flow sensing devices are capable of counting individual granular particles of various sizes when flowing through a conduit (e.g., primary line) in an airstream. However, these sensors are not capable of differentiating multiple different product types flowing the conduit simultaneously.

Accordingly, as will be described in more detail below, embodiments described herein provide a multi-product particle flow rate sensing system configured to differentiate and count multiple different product types flowing through a common conduit or line simultaneously in order to provide the ability to regulate individual product meters to maintain a desired application rate or plant population. For example, one embodiment includes the sensing system including a sensor or sensor array that differentiates and counts different product types flowing simultaneously through a sensing area. In certain embodiments, the sensing system includes a single sensor configured to differentiate and count the different product types. In other embodiments, the sensing system includes a single sensor array (e.g., including multiple sensors in a single housing) configured to differentiate and count the different product types. In further embodiments, the sensing system may include more than one sensor or sensor array disposed at a variety of locations (e.g., on a common conduit, on a conduit that handles a single product type, on a metering device, etc.). In certain embodiments, a single sensor or sensor array coupled to a common conduit monitors a flow rate of a first product type flowing (e.g., solely flowing) through the common conduit at a first time and then measures a combined flow rate of both the first product type and the second product type from which the flow rate of the second product type may be determined. In other embodiments, different sensor or sensors arrays may be utilized to determine the flow rates of the product types. For example, a sensor or sensor array may be disposed at a location on the common conduit or another conduit where only the first product type flows and monitor the flow rate of the first product type, while another sensor or sensor array may be disposed on the common conduit at another location to monitor the combined flow rate of the first product type and the second product type flowing through the common conduit simultaneously from which the flow rate of the second product type may be determined. The one or more sensor or sensor arrays provide feedback to a controller that determines the respective flow rates and then adjusts the respective metering devices associated with the different product types. Thus, the sensing system provides the ability to regulate metering of individual products to maintain a desired application rate or plant population.

Figure 1:
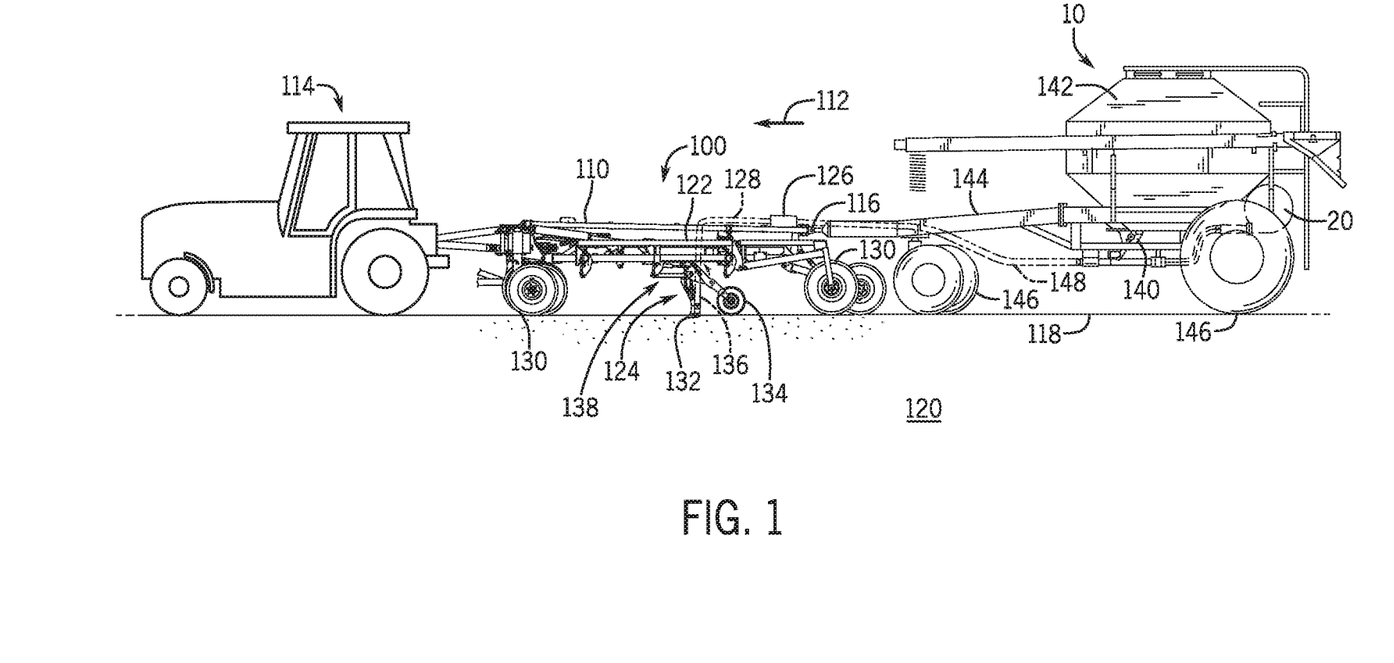
FIG. 1 is a side view of an embodiment of an air cart including a multi-product particle flow rate sensing system, in accordance with an aspect of the present disclosure.

Turning now to the drawings, FIG. 1 is a side view of an embodiment of an agricultural material application system 100. As depicted, the agricultural material application system 100 (e.g., a seeding system or a planter system) includes an agricultural implement 110 coupled to an air cart 10. In the depicted embodiment, the air cart 10 is towed behind the agricultural implement 110, relative to a direction of travel 112. In addition, the agricultural implement 110 is coupled to a work vehicle 114 by a first hitch system, and the air cart 10 is coupled to the agricultural implement 110 by a second hitch system 116. While the agricultural implement 110 is towed between the work vehicle 114 and the air cart 10 in the illustrated embodiment, in other embodiments, the agricultural implement may be towed behind the air cart. In further embodiments, the implement and the air cart may be part of a single unit that is towed behind the work vehicle, or the agricultural implement and the air cart may be elements of a self-propelled vehicle.

The agricultural implement 110 may deposit rows of seeds into the soil as the agricultural implement 110 is towed across a surface 118 of an agricultural field 120 by the work vehicle 114. The agricultural implement 110 includes a tool frame 122 coupled to a row unit 124 (e.g., a ground engaging opener system), a distribution header 126, a hose 128, and wheel assemblies 130. The wheel assemblies 130 may contact the surface 118 to enable the agricultural implement 110 to be towed by the work vehicle 114. As the agricultural implement 110 moves in the direction of travel 112, a row of seeds may be deposited into the soil by the row unit 124. Although only one row unit 124 is shown, the agricultural implement 110 may include multiple row units 124 organized in a row across a width of the agricultural implement 110. In some embodiments, the agricultural implement 110 may include a row of 12, 14, 16, 18, 20, or more row units 124, which may each deposit a respective row of seeds.

To facilitate depositing seeds, each row unit 124 includes an opener 132, a press wheel 134, a seed tube 136, and a hydraulic cylinder 138. When the opener 126 engages the soil, the opener 132 may exert a force that excavates a trench into the soil as the row unit 124 travels through the field. In the present embodiment, a position of the press wheel 134 controls the depth of the opener 132 and the hydraulic cylinder 138 controls the downward force (e.g., a down pressure). For example, the opener 132 may be controlled to establish a target the depth of the trench. Seeds may then be deposited into the excavated trench via the seed tube 136. Then, the press wheel 134 may facilitate movement of the excavated soil into the trench to cover the seeds and compress the soil covering the seeds.

The air cart 10 may centrally store seeds and distribute the seeds to the row unit 124. Accordingly, the air cart 10 includes a metering assembly 140 (e.g., agricultural material meter), a storage tank 142, a frame 144, wheels 146, and an air source 20. In the depicted embodiment, the air cart frame 10 is coupled to the tool frame 122 via the hitch 116. The wheels 146 may contact the surface 118 to enable the air cart 10 to be towed along with the agricultural implement 110. Additionally, the storage tank 142 may centrally store the seeds for distribution. In some embodiments, the storage tank 142 may include multiple compartments or multiple tanks on a common frame for storing different types of granular materials. For example, a first compartment may store seeds while a second compartment may store a dry fertilizer. In such configurations, the air cart 10 may deliver both seed and fertilizer to the agricultural implement 110 via separate distribution systems, or as a mixture through a single distribution system.

Generally, the distribution system may control the amount of seeds distributed to the agricultural field 120, for example, using the metering assembly 134. For example, the metering assembly 140 may be controlled to increase or decrease the amount of seeds distributed to the agricultural field 120. As depicted, the metering assembly 140 is mounted to the bottom of the storage tank 142, which may enable the storage tank 140 to supply seeds to the metering assembly 140. The metering assembly 140 may then distribute the seeds to the distribution header 126 via a respective hose 148. The distribution headers 126 may then distribute the seeds to one or more row units 124 via the hose 128. In this manner, the metering assembly 134 may control distribution of seeds from the storage tank 142 to the row units 124 and into the trenches.

The metering assembly 140 may control the flow of seeds into an air stream generated by the air source 20, thereby controlling seed distribution to the row units for deposition into the soil. In some embodiments, the air source 20 may be a pump or blower powered by an electric or hydraulic motor, for example. As described in greater detail below, each storage compartment may include a respective metering device for metering the product stored within. To more clearly illustrate in FIG. 2, a schematic view of the air cart 10 is provided. As illustrated, the air cart 10 includes multiple storage tanks or compartments. In particular, the air cart 10 includes a first storage tank 22 and a second storage tank 24. The number of storage tanks or compartments may vary (e.g., 2, 3, 4, 5, etc.). The first storage tank 22 stores a first granular product type (e.g., seed) and the second storage tank 24 stores a second different granular product type (e.g., fertilizer). In certain embodiments, the air cart 10 may include more storage tanks that store different components of a fertilizer (e.g., phosphate, nitrogen, etc.). The first storage tank 22 and the second storage tank 24 are associated with respective metering devices 26, 28 that meter the respective product types from the tanks 22, 24.

Figure 2:
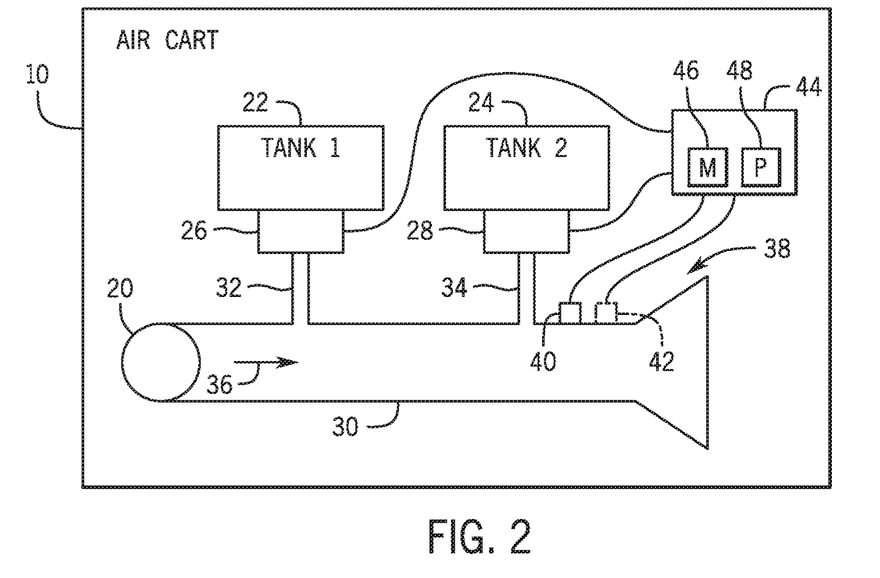
FIG. 2 is a schematic view of an embodiment of a multi-product particle flow rate sensing system (e.g., having primary conduits separately coupled to a common conduit) that may be employed within the air cart of FIG. 1, in accordance with an aspect of the present disclosure.

The storage tanks 22, 24 are coupled to a common conduit 30 (e.g., primary line) via respective conduits 32, 34 (e.g., secondary conduits). In certain embodiments, more than two storage tanks may be coupled to a primary line via respective conduits. In certain embodiments, the air tank 10 may include multiple common conduits or primary lines coupled to multiple storage tanks. The different product types may be entrained in the air flow 36 from the air source 20 within the common conduit 30.

The air cart 10 includes a multi-product particle flow rate sensing system 38. The sensing system 38 includes one or more sensor or sensor arrays disposed in a respective sensor housing. The one or more sensors or sensor arrays are configured to differentiate and count different granular product types individually (e.g., when flowing simultaneously through a sensing area). The sensors or sensor arrays may utilize one or more of photoelectric sensing, machine vision sensing, piezoelectric sensing, acoustic sensing, and/or another sensing technology. Different characteristics that may be utilized by the sensors or sensors arrays to differentiate the different product types include shape, size, color, acoustic contact response, and/or other characteristics. In certain embodiments, a single sensor within a sensor housing may differentiate the different product types flowing simultaneously through a sensing area. In certain embodiments, a sensor array having multiple sensors within a single sensor housing may differentiate the different product types flowing simultaneously through a sensing area. In certain embodiments, multiple sensors or sensor arrays (e.g., in respective sensor housings) may be disposed at different locations (e.g., in series) to enable differentiation of the different product types flowing simultaneously through a sensing area.

As depicted, the sensing system 38 includes a sensor or sensor array 40 disposed on the common conduit 30 at a location where both the first and second products types flow simultaneously. In certain embodiments, the sensor or sensor array 40 may be the only sensor or sensor array utilized to differentiate and count the different product types flowing simultaneously through the sensing area. For example, the sensor or sensor array 40 may be configured to distinguish the different product types. Alternatively, the metering of the first product or second product type into the common conduit 30 may be time delayed relative to each other to enable the sensor or sensor array 40 to initially detect whichever product is flowing first through the common conduit 30 at a first time and then subsequently detect the combined products flowing simultaneously through the common conduit 30 at a second later time. In certain embodiments, more than one sensor or sensor array may be utilized in a sensing area to differentiate the different product types. For example, an additional sensor or sensor array 42 may be coupled in series along the common conduit 30 adjacent to the sensor or sensor array 40. The first sensor or sensor array 40 may detect and count the first product, while the second sensor or sensor array 42 may detect and count the second product.

The sensing system 38 includes a controller 44 coupled to the sensors or sensor arrays 40, 42. The controller 44 is configured to receive feedback or signals from the sensor or sensor arrays 40, 42 to determine the respective flow rates for the different product types and/or a combined flow rate. In certain embodiments, the controller 44 is configured to determine the flow rate of one product type from both the combined flow rate of the product types and a flow rate of the other product type. As depicted, the controller 44 is coupled to the metering devices 26, 28. In certain embodiments, based on the respective flow rates of the different product types, the controller 44 may cause the metering devices 26, 28 to adjust the metering of the first and second granular product types, respectively, to maintain a desired or set application rate or plant population.

The controller 44 may include a memory 46 and a processor 48. In some embodiments, the processor 48 may include one or more general purpose processors, one or more application specific integrated circuits, one or more field programmable gate arrays, or the like. Additionally, the memory 46 may be any tangible, non-transitory, computer readable medium that is capable of storing instructions executable by the processor 48 and/or data that may be processed by the processor 48. In other words, the memory 46 may include volatile memory, such as random access memory, or non-volatile memory, such as hard disk drives, read only memory, optical disks, flash memory, and the like.

Figure 3:
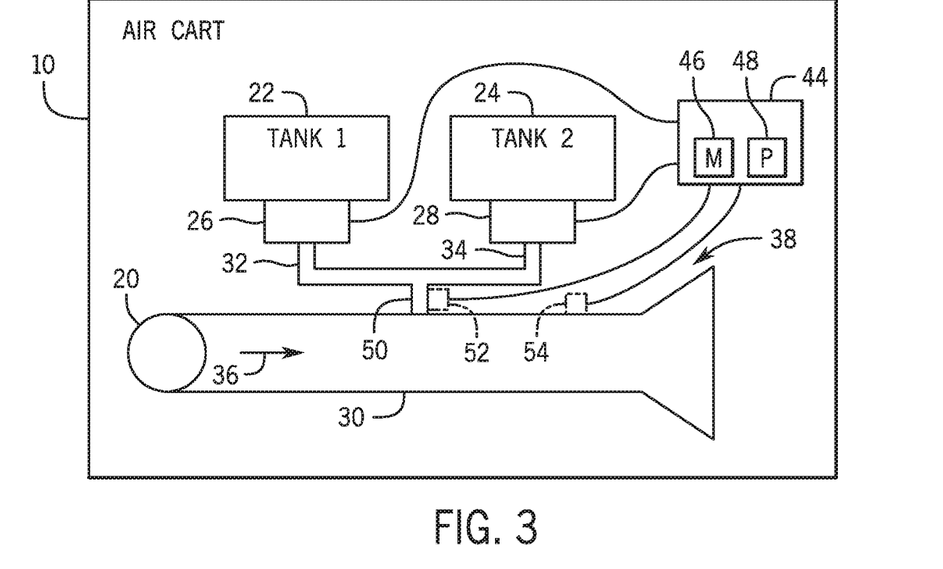
FIG. 3 is a schematic view of an embodiment of a multi-product particle flow rate sensing system (e.g., having primary conduits form a common conduit) that may be employed within the air cart of FIG. 1, in accordance with an aspect of the present disclosure.
Figure 4:
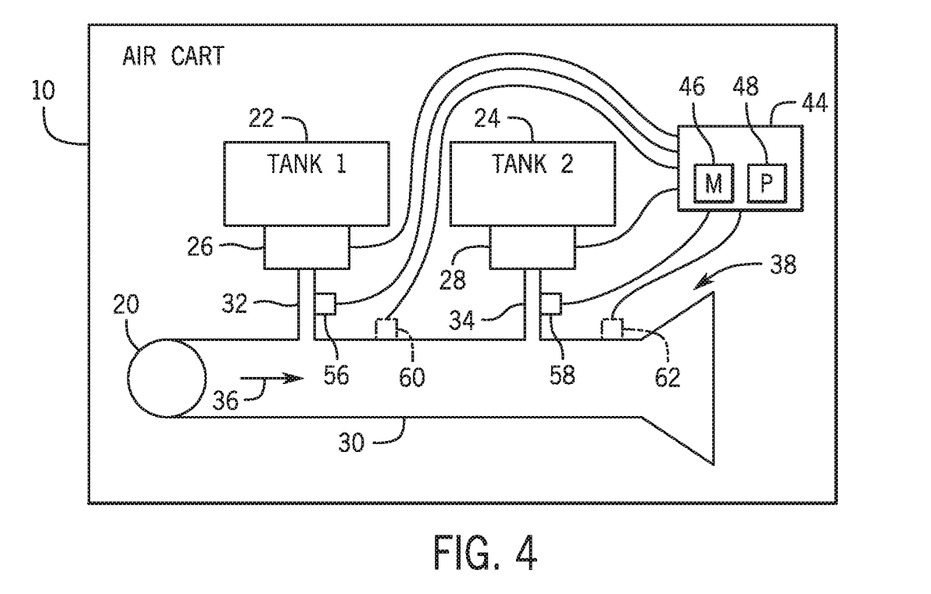
FIG. 4 is a schematic view of an embodiment of a multi-product particle flow rate sensing system (e.g., having sensors associated with primary conduits) that may be employed within the air cart of FIG. 1, in accordance with an aspect of the present disclosure.
Figure 5:
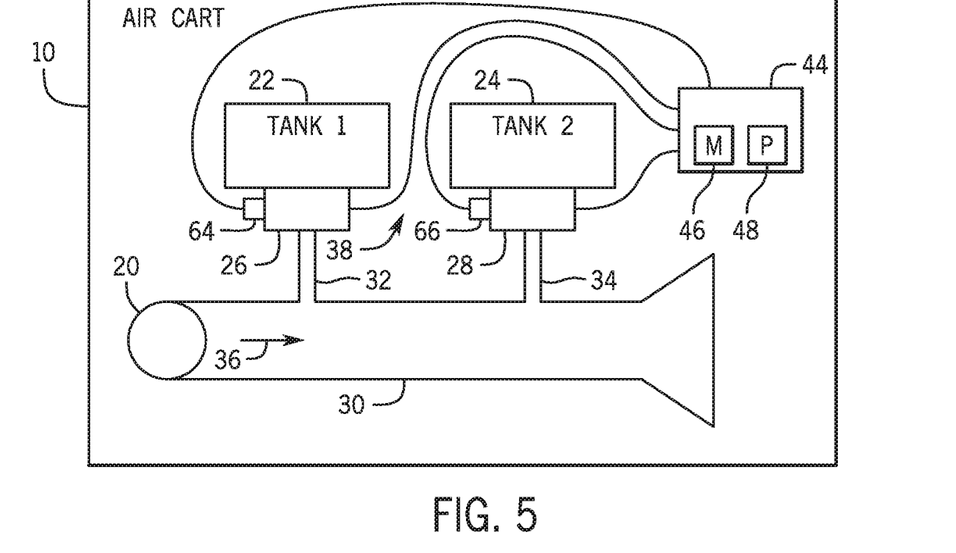
FIG. 5 is a schematic view of an embodiment of a multi-product particle flow rate sensing system (e.g., having sensors associated with metering devices) that may be employed within the air cart of FIG. 1, in accordance with an aspect of the present disclosure.

In certain embodiments, the location of the sensors or sensor arrays of the sensing system 38 within the air cart 10 may vary as illustrated in FIGS. 3-5. In general, in FIGS. 3-5, the air cart 10 is as described in FIG. 2 with a few exceptions as noted below. As depicted in FIG. 3, the respective conduits 32, 34 form a common secondary conduit 50 that is coupled to the common conduit 30. In certain embodiments, a single sensor or sensor array 52 may be disposed on the secondary conduit 50 to detect and count the different product types. In certain embodiments, an additional sensor or sensor array 54 may be coupled to the common conduit 30 downstream of the secondary conduit 50. The sensors or sensors arrays 52, 54 may be utilized similar to the sensors or sensor arrays 40, 42 described in FIG. 2.

In certain embodiments, as depicted in FIG. 4, the sensing system 38 may include sensors or sensor arrays disposed on one or more of the conduits 32, 34. For example, in certain embodiments, a sensor or sensor array 56 is disposed on the conduit 32 and a sensor or sensor array 58 is disposed on the conduit 34. Each sensor or sensor array 56, 58 detects and counts the first and second granular product types, respectively, flowing through conduits 32, 34, which the controller 44 utilizes to determine the respective flow rates of the first and second granular product types and to adjust the metering of the first and second granular product types. In certain embodiments, a sensor or sensor array 60 may be located at a location on the common conduit 30 upstream of the conduit 34 and/or a sensor or sensor array 62 may be located at a location on the common conduit 30 downstream of the conduit 34. In a first example, the sensor or sensor array 60 may be utilized in conjunction with the sensor or sensor array 58 to detect and count the first and second granular product types, respectively. In this case, the controller 44 determines the respective flow rates of the first and second granular product types and to adjust the metering of the first and second granular product types based on the respective feedback from the sensors 60, 58. In a second example, the sensor or sensor array 60 may be utilized to detect and count the first granular product type, while the sensor or senor array 62 is utilized to detect and count both the first and second granular product types flowing simultaneously through the common conduit 30. In this case, the controller 44 determines the flow rate of the first granular product type and the total flow rate of the first and second granular product types based on the respective feedback from the sensors 60, 62, while determining the flow rate of the second product type based on the difference between the flow rate of the first granular product type and the total flow rate. In a third example, the sensor or sensor array 58 may be utilized to detect and count the second granular product type, while the sensor or senor array 62 is utilized to detect and count both the first and second granular product types flowing simultaneously through the common conduit 30. In this case, the controller 44 determines the flow rate of the second granular product type and the total flow rate of the first and second granular product types based on the respective feedback from the sensors 58, 62, while determining the flow rate of the second product type based on the difference between the flow rate of the second granular product type and the total flow rate.

In certain embodiments, as illustrated in FIG. 5, the sensing system 38 may include sensors or sensor arrays disposed on the metering devices. For example, as depicted, sensor or sensor array 64 and sensor or sensor array 66 are disposed on the metering devices, 26, 28, respectively. This enables the sensors 64, 66 in conjunction with the controller 44 to determine instantaneous flow rates of the first and second granular product types, respectively, which may be utilized to the adjust the respective metering rates.

Figure 6:
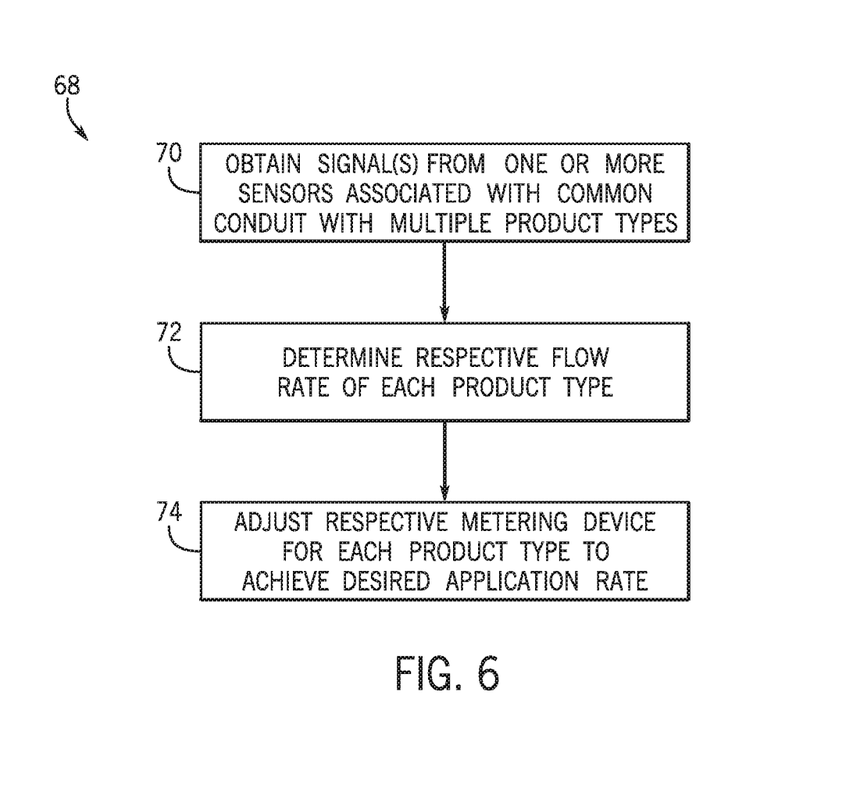
FIG. 6 is a flowchart of an embodiment of a method to determine respective flow rates of multiple product types within a common conduit, in accordance with an aspect of the present disclosure.

FIG. 6 is a flowchart of an embodiment of a method 68 to determine respective flow rates of multiple product types within a common conduit. The steps of the method 68 may be performed by the controller 44 of the air cart 10 described above. The method 68 includes obtaining one or more signals (e.g., feedback) from one or more sensors associated with a common conduit having multiple granular product types flowing through it (block 70). In certain embodiments, a single sensor or sensor array may be disposed on the common conduit at a location where both the granular product types flow simultaneously. In certain embodiments, multiple sensor or sensor arrays may be disposed on the common conduit (e.g., in series) at a location where both the granular product types flow simultaneously with each sensor or sensor array detecting and counting different specific granular product types. In certain embodiments, a sensor or sensor array is located at a location on the common conduit or another conduit where only a single granular product type flows, while another sensor or sensor array is located on the common conduit at a location where both the first and second granular product types flow simultaneously.

The method 68 also includes determining the respective flow rates of each product type based on the feedback from the one or more sensors or sensor arrays (block 72). In certain embodiments, the flow rates for the different product types may be determined from feedback from a single sensor or sensor array. In certain embodiments, the flow rates for the different product types may be determined from feedback from more than one sensor or sensor array in a sensing area (e.g., in a series arrangement) where both the product types flow simultaneously, where each sensor or sensor array provides feedback regarding a different granular product type. In certain embodiments, the flow rate for one of the product types may be determined based on feedback from a sensor or sensor array located where only that product type (e.g., first granular product type) flows, while the total flow rate for both granular product types is provided by another sensor or sensor array located where both granular product types flow at the same time. The flow rate of the other granular product type (e.g., second granular product type) is determined based on a difference between the flow rate of the other granular product type (e.g., first granular product type) and the total flow rate of both the first and second granular product types. The method 68 further includes adjusting respective metering devices for each product type to maintain a desired or set application rate or plant population (block 74).

Figure 7:
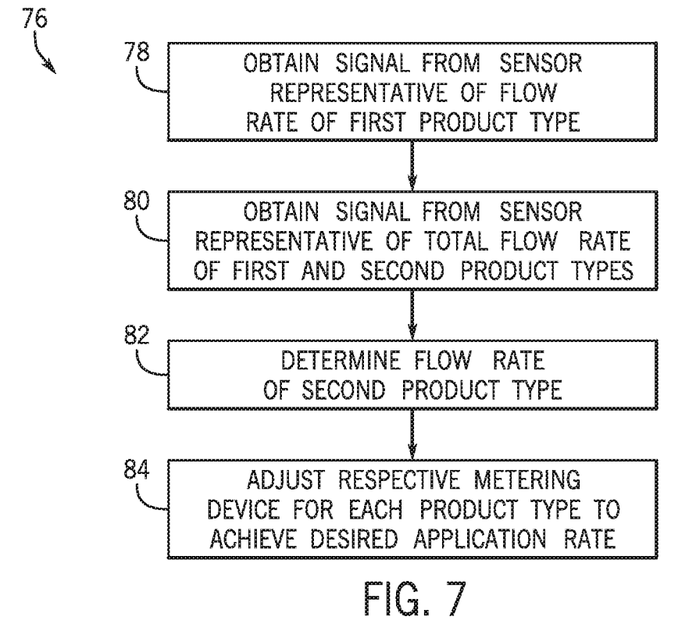
FIG. 7 is a flowchart of an embodiment of a method to determine respective flow rates of multiple product types utilizing different sensors, in accordance with an aspect of the present disclosure.

FIG. 7 is a flowchart of an embodiment of a method 76 to determine respective flow rates of multiple product types utilizing different sensors or sensor arrays. The steps of the method 76 may be performed by the controller 44 of the air cart 10 described above. The method 76 includes obtaining a signal (e.g., feedback) from a sensor or sensor array located at a location on a common conduit or another conduit where only a single granular product type flows (block 78), which would be representative of the single product type (e.g., first product type). The method 76 also includes obtaining a signal (e.g., feedback) from another sensor or sensor array disposed on the common conduit at a location where both the granular product types flow simultaneously (block 80), which would be representative of a total flow of both the first and second granular product types. The method 76 further includes determining the flow rate of the second product type (block 82). The flow rate of the second granular product type is determined based on a difference between the flow rate of the first granular product type and the total flow rate of both the first and second granular product types. The method 76 further includes adjusting respective metering devices for each product type to maintain a desired or set application rate or plant population (block 84).

Figure 8:
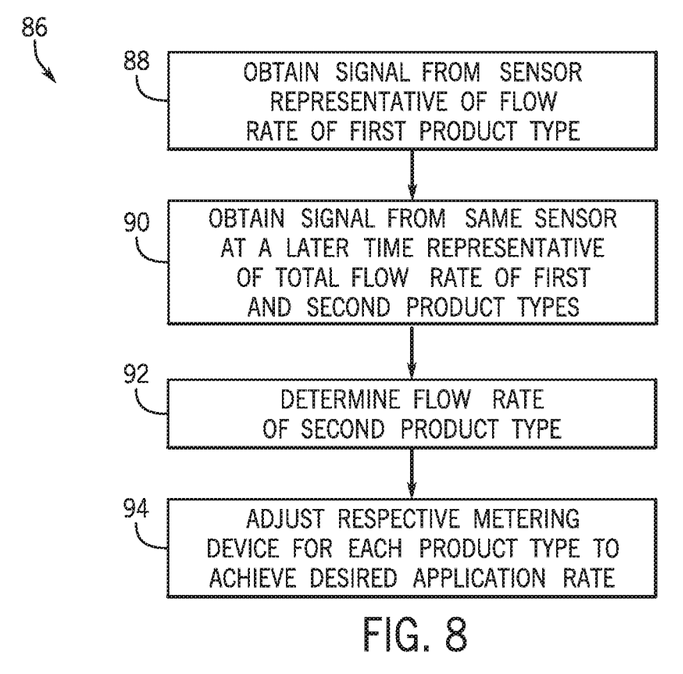
FIG. 8 is a flowchart of an embodiment of a method to determine respective flow rates of multiple product types utilizing the same sensor, in accordance with an aspect of the present disclosure.

FIG. 8 is a flowchart of an embodiment of a method 86 to determine respective flow rates of multiple product types utilizing the same sensor (utilizing a time delay between the metering of the different granular product types). The steps of the method 86 may be performed by the controller 44 of the air cart 10 described above. The method 86 includes obtaining a signal (e.g., feedback) at a first time from a sensor or sensor array located at a location on a common conduit where only a single granular product type initially flows (block 88), which would be representative of the flow of the single granular product type (e.g., first granular product type). The location of the sensor or sensor array is also on the common conduit where both the first and second granular product types will subsequently simultaneously flow. The method 86 also includes obtaining a signal (e.g., feedback) from the same sensor or sensor array at a later second time when both granular product types are simultaneously flowing through the common conduit (block 90), which would be representative of a total flow of both the first and second granular product types. The method 76 further includes determining the flow rate of the second product type (block 92). The flow rate of the second granular product type is determined based on a difference between the flow rate of the first granular product type and the total flow rate of both the first and second granular product types. In certain embodiments, the same method can be applied when the second granular product type is metered into the common conduit slightly prior to the first granular product type. The method 86 further includes adjusting respective metering devices for each product type to maintain a desired or set application rate or plant population (block 94).

While only certain features of the disclosure have been illustrated and described herein, many modifications and changes will occur to those skilled in the art. It is, therefore, to be understood that the appended claims are intended to cover all such modifications and changes as fall within the essence of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An air cart for use in an agricultural air seeding system, comprising:
   a first storage compartment for holding a first granular product type;
   a second storage compartment for holding a second granular product type different from the first granular product type;
   a common conduit configured to receive the first granular product type from the first storage compartment and the second granular product type from the second storage compartment to enable simultaneous flow of the first granular product type and the second granular product type; and a multi-product particle flow rate sensing system configured to monitor respective flow rates for both the first granular product type and the second granular product type at a location within the common conduit where both the first granular product type and the second granular product type flow during simultaneous flow of the first granular product type and the second granular product type through the common conduit.

2. The air cart of claim 1, comprising a controller coupled to the multi-product particle flow rate sensing system, wherein the controller is configured to receive feedback from the multi-product particle flow rate sensing system and to determine the respective flow rates for both the first granular product type and the second granular product type at the location within the common conduit based on the feedback.

3. The air cart of claim 2, comprising:
a first metering device coupled to the first storage compartment and configured for metering the first granular product type from the first storage compartment; and
a second metering device coupled to the second storage compartment and configured for metering the second granular product type from the second storage compartment.

4. The air cart of claim 3, wherein the controller is coupled to the first metering device and the second metering device and is configured to adjust the first and second metering devices based on the respective flow rates to maintain a desired application rate.

5. The air cart of claim 2, wherein the multi-product particle flow rate sensing system comprises a single sensor coupled to the common conduit, wherein the single sensor is configured to monitor the respective flow rates for both the first granular product type and the second granular product type at the location during simultaneous flow of the first granular product type and the second granular product type through the common conduit.

6. The air cart of claim 5, wherein the single sensor comprises a photoelectric sensor, a machine vision sensor, piezoelectric sensor, or an acoustic sensor.

7. The air cart of claim 5, wherein the controller is configured to receive feedback from the single sensor at a first time where only the first granular product type is flowing through the common conduit, to determine a first flow rate for the first granular product type based on the feedback at the first time, to receive feedback from the single sensor at a second time later than the first time where first granular product type and the second granular product type are flowing simultaneously through the common conduit, to determine a combined flow rate for the first granular product type and the second granular product type based on the feedback at the second time, and to determine a second flow rate for the second granular product type based on the first flow rate and the combined flow rate.

8. The air cart of claim 2, comprising a first conduit coupling the first storage compartment to the common conduit and a second conduit coupling the second storage compartment to the common conduit.

9. The air cart of claim 8, wherein the multi-product particle flow rate sensing system comprises:
a first sensor or sensor array coupled to the first conduit, the second conduit, or to the common conduit upstream of the second conduit; and
a second sensor or sensor array coupled to the common conduit at the location where both the first granular product type and the second granular product type flow simultaneously through the common conduit;
wherein the controller is configured to determine the respective flow rates for the first granular product type and the second granular product type based on feedback from the first sensor or sensor array and the second sensor or sensor array.

10. The air cart of claim 9, wherein the controller is configured to determine a first flow rate for the first granular product type based on the feedback from the first sensor or sensor array when the first sensor or sensor array is coupled to the first conduit or the common conduit upstream of the second conduit, to determine a total flow rate based on the feedback from the second sensor or sensor array, and to determine a second flow rate for the second granular product type based on the first flow rate and the total flow rate.

11. The air cart of claim 9, wherein the controller is configured to determine a second flow rate for the second granular product type based on the feedback from the first sensor or sensor array when the first sensor or sensor array is coupled to the second conduit, to determine a total flow rate based on the feedback from the second sensor or sensor array, and to determine a first flow rate for the first granular product type based on the second flow rate and the total flow rate.

12. A multi-product particle flow rate sensing system for an air cart, comprising:
a first sensor or sensor array configured to couple to a common conduit at a first location where a first granular product type and a second granular product type different from the first granular product type flow simultaneously through the common conduit; and
a controller coupled to the first sensor or sensor array and configured to receive feedback from the first sensor or sensor array and to determine a first flow rate for the first granular product type at the first location, a second flow rate for the second granular product type at the first location, or both the first flow rate and the second flow rate at the first location based on the feedback.

13. The multi-product particle flow rate sensing system of claim 12, wherein the controller is configured to determine the first flow rate and the second flow rate based on the feedback from the first sensor or sensor array.

14. The multi-product particle flow rate sensing system of claim 13, wherein the controller is configured to receive feedback from the first sensor or sensor array at a first time where only the first granular product type is flowing through the common conduit, to determine a first flow rate for the first granular product type based on the feedback at the first time, to receive feedback from the first sensor or sensor array at a second time later than the first time where first granular product type and the second granular product type are flowing simultaneously through the common conduit, to determine a combined flow rate for the first granular product type and the second granular product type based on the feedback at the second time, and to determine a second flow rate for the second granular product type based on the first flow rate and the combined flow rate.

15. The multi-product particle flow rate sensing system of claim 12, comprising a second sensor or second sensor array configured to couple to a first conduit or a second location of the common conduit where only the first granular product type flows, and wherein the controller is configured to determine the first flow rate for the first granular product type based on the feedback from the second sensor or sensor array, to determine a total flow rate based on the feedback from the first sensor or sensor array, and to determine the second flow rate for the second granular product type based on the first flow rate and the total flow rate.

16. The multi-product particle flow rate sensing system of claim 12, comprising a second sensor or second sensor array configured to couple to a second conduit where only the second granular product type flows, and wherein the controller is configured to determine the second flow rate for the second granular product type based on the feedback from the second sensor or sensor array, to determine a total flow rate based on the feedback from the first sensor or sensor array, and to determine the first flow rate for the first granular product type based on the second flow rate and the total flow rate.

17. The multi-product particle flow rate sensing system of claim 12, wherein the controller is coupled to respective metering devices for the first and second granular product types and is configured to adjust the respective metering devices based on the first flow rate and the second flow rate to maintain a desired application rate.

18. A method for multi-product particle flow rate sensing for an air cart, comprising:
   receiving, at a controller, feedback from a first sensor or sensor array coupled to a common conduit at a first location where a first granular product type and a second granular product type different from the first granular product type flow simultaneously through the common conduit; and
   determining, via the controller, a first flow rate for the first granular product type at the first location, a second flow rate for the second granular product type at the first location, or both the first flow rate and the second flow rate at the first location based on the feedback from the first sensor or sensor array.

19. The method of claim 18, wherein receiving the feedback from the first sensor or sensor array comprises receiving feedback from the first sensor or sensor array at a first time where only the first granular product type is flowing through the common conduit, and receiving feedback from the first sensor or sensor array at a second time later than the first time where first granular product type and the second granular product type are flowing simultaneously through the common conduit, and further comprising:
   determining, via the controller, the first flow rate for the first granular product type based on the feedback at the first time;
   determining, via the controller, a combined flow rate for the first granular product type and the second granular product type based on the feedback at the second time; and
   determining, via the controller, a second flow rate for the second granular product type based on the first flow rate and the combined flow rate.

20. The method of claim 18, comprising:
   receiving, at the controller, feedback from a second sensor or second sensor array coupled to a conduit or a second location of the common conduit where only the first granular product type flows;
   determining, via the controller, the first flow rate for the first granular product type based on the feedback from the second sensor or sensor array;
   determining, via the controller, a total flow rate based on the feedback from the first sensor or sensor array; and
   determining, via the controller, the second flow rate for the second granular product type based on the first flow rate and the total flow rate.

\* \* \* \* \*